United States Patent
Tanaka et al.

(10) Patent No.: US 7,397,208 B2
(45) Date of Patent: Jul. 8, 2008

(54) WINDING CONTROL METHOD OF SEATBELT RETRACTOR AND SEATBELT DEVICE

(75) Inventors: Koji Tanaka, Moriyama (JP); Masato Takao, Hikone (JP); Koji Inuzuka, Echi-gun (JP)

(73) Assignee: Takata Corporation, Tokyo (JP)

( * ) Notice: Subject to any disclaimer, the term of this patent is extended or adjusted under 35 U.S.C. 154(b) by 584 days.

(21) Appl. No.: 11/125,216

(22) Filed: May 10, 2005

(65) Prior Publication Data

US 2005/0253012 A1 Nov. 17, 2005

(30) Foreign Application Priority Data

May 13, 2004 (JP) .............................. 2004-143179

(51) Int. Cl.
*H02P 3/00* (2006.01)

(52) U.S. Cl. ........................ 318/264; 318/266; 318/280; 318/282; 280/801.1; 280/802; 280/806; 280/807; 180/268

(58) Field of Classification Search ............ 318/400.01, 318/430–434; 180/268; 280/735, 806, 807
See application file for complete search history.

(56) References Cited

U.S. PATENT DOCUMENTS

| | | | |
|---|---|---|---|
| 4,669,680 A | | 6/1987 | Nishimura et al. |
| 6,213,512 B1 | | 4/2001 | Swann et al. |
| 6,257,363 B1 * | | 7/2001 | Midorikawa et al. ........ 180/268 |
| 6,485,057 B1 * | | 11/2002 | Midorikawa et al. ........ 280/807 |
| 6,494,395 B1 | | 12/2002 | Fujii et al. |
| 6,561,299 B2 * | | 5/2003 | Midorikawa et al. ........ 180/268 |
| 6,729,650 B2 * | | 5/2004 | Midorikawa et al. ........ 280/807 |
| 6,843,339 B2 * | | 1/2005 | Midorikawa et al. ........ 180/268 |
| 6,997,277 B2 * | | 2/2006 | Midorikawa et al. ........ 180/268 |
| 6,997,474 B2 * | | 2/2006 | Midorikawa et al. ........ 280/735 |
| 7,040,444 B2 * | | 5/2006 | Midorikawa et al. ........ 180/286 |
| 7,077,231 B2 * | | 7/2006 | Midorikawa ................. 180/268 |
| 7,251,111 B2 * | | 7/2007 | Tanaka et al. ........... 318/400.01 |
| 2001/0025735 A1 * | | 10/2001 | Midorikawa et al. ........ 180/268 |
| 2003/0015864 A1 * | | 1/2003 | Midorikawa et al. ........ 280/807 |
| 2003/0173131 A1 * | | 9/2003 | Midorikawa et al. ........ 180/268 |
| 2004/0104570 A1 * | | 6/2004 | Midorikawa et al. ........ 280/807 |
| 2004/0108697 A1 * | | 6/2004 | Midorikawa et al. ........ 280/735 |
| 2005/0017494 A1 * | | 1/2005 | Midorikawa ............. 280/801.1 |
| 2005/0077412 A1 * | | 4/2005 | Tanaka et al. ............. 242/390.9 |
| 2005/0077717 A1 * | | 4/2005 | Midorikawa ................. 280/806 |
| 2005/0146128 A1 * | | 7/2005 | Midorikawa et al. ........ 280/807 |
| 2005/0253012 A1 * | | 11/2005 | Tanaka et al. ............. 242/390.9 |
| 2007/0114775 A1 * | | 5/2007 | Inuzuka et al. .............. 280/807 |
| 2007/0199758 A1 * | | 8/2007 | Saito et al. ................... 180/268 |

FOREIGN PATENT DOCUMENTS

| | | |
|---|---|---|
| DE | 43 14 176 | 11/1994 |
| EP | 0 893 313 | 1/1999 |
| EP | 1 243 486 | 9/2002 |
| JP | 03000552 | 1/1991 |

* cited by examiner

*Primary Examiner*—Paul Ip
(74) *Attorney, Agent, or Firm*—Manabu Kanesaka

(57) ABSTRACT

A winding control method of a seatbelt retractor for winding a seatbelt with a motor includes detecting a current flowing through the motor, and stopping the motor when the current exceeds a predetermined value. The winding action is not stopped while the motor is accelerated even when the current exceeds the predetermined value.

9 Claims, 3 Drawing Sheets

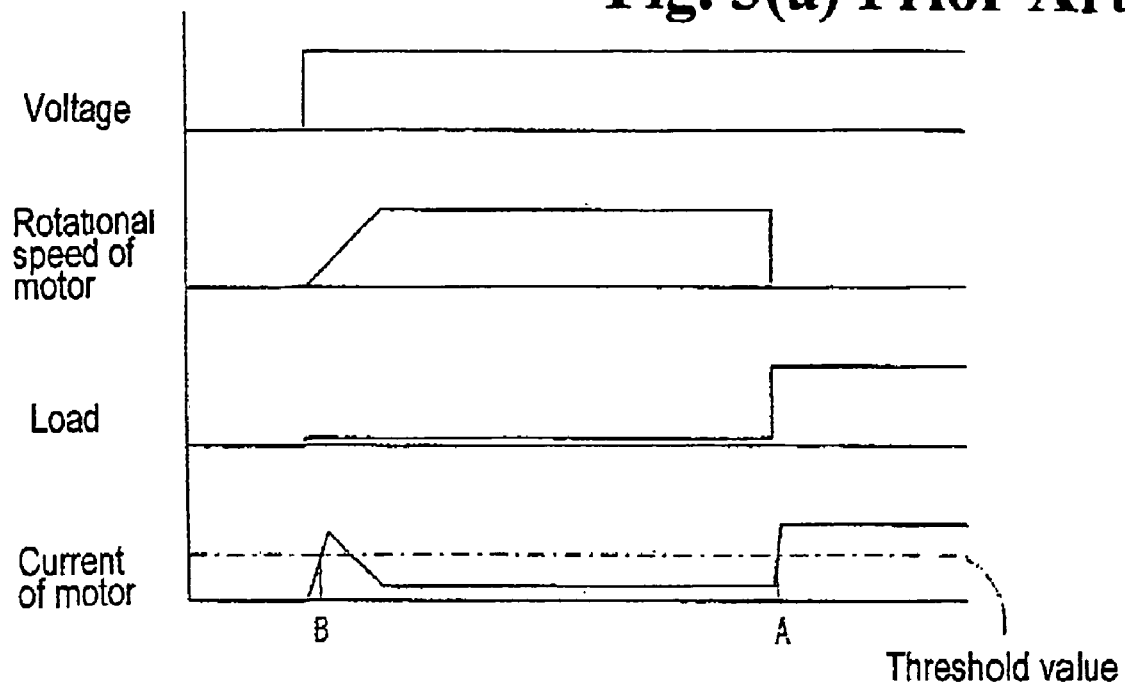
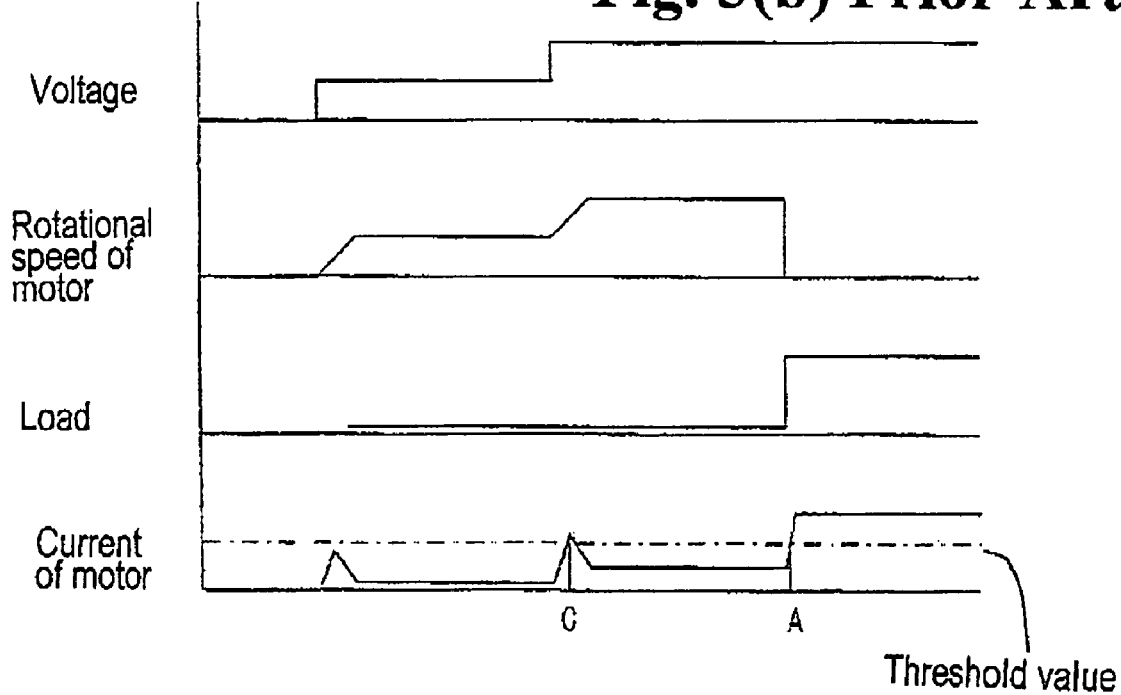

WINDING CONTROL METHOD OF SEATBELT RETRACTOR AND SEATBELT DEVICE

BACKGROUND OF THE INVENTION AND RELATED ART STATEMENT

The present invention relates to a winding control method of a seatbelt retractor having a function of winding up a seatbelt with a motor, and a seatbelt device having the seatbelt retractor.

In a seatbelt retractor, it is necessary to securely wind up an excessively withdrawn portion of a seatbelt until the seatbelt fits an occupant, or to wind up the withdrawn seatbelt until the seatbelt is securely housed in a casing. It is also necessary to reduce unnecessary tightness in chest or the like of an occupant when the occupant wears the seatbelt in a normal state. The seatbelt retractor may utilize an urging force of a single return spring for winding the seatbelt. When the return spring has a small urging force for winding up the seatbelt to reduce a pressure on the chest of the occupant during wearing, the urging force may be too small to properly retract the seatbelt, thereby deteriorating operational and retracting performance. On the other hand, when the return spring has a large urging force for winding up the seatbelt, the occupant may feel tightness in the chest when wearing the belt in a normal state.

In order to solve the problems, Japanese Patent Publication (Kokai) No. 03-552 and Japanese Patent Publication (Kokai) No. 2001-225720 have disclosed a seatbelt retractor for winding up a seatbelt with a motor in addition to an urging force of a return spring.

When a motor is used for winding a seatbelt, there are the following requirements:

(1) It is necessary to stop power supply to the motor (to stop the winding action) when the seat belt is fully wound. Otherwise, electric power of a buttery is unnecessarily consumed for supplying a current to the motor, and the motor needs to avoid overheat due to a high current flowing for a long period of time.

(2) It is necessary to stop power supply to the motor (to stop the winding action) when the seatbelt is caught by something or an occupant tries to withdraw the seatbelt during the winding of the seat belt. Otherwise, electric power of a buttery is unnecessarily consumed for supplying a current to the motor, and the occupant needs to withdraw the seatbelt under a large resistance force, thereby making the occupant unconformable.

In order to solve the problems, in a conventional seatbelt winding control device, a current flowing through a motor is detected. When a value of the detected current exceeds a predetermined value, it is determined that the present state is one of (1) and (2), and power supply to the motor is cut off (to stop the winding action).

However, such a winding control method of the seatbelt retractor has the following problems. In general, when a winding-up speed is controlled to increase stepwise immediately after a command is sent to the motor to wind up a seatbelt, an accelerating current flows in the motor as shown in FIGS. 3(a) and 3(b).

FIG. 3(a) shows a normal winding control. The winding of the seatbelt is started in a state that a constant voltage is applied to the motor. When the seatbelt is fully wound, the motor is stopped as mentioned above. When the current of the motor rapidly increases and exceeds a threshold value at a point A, the voltage applied to the motor becomes zero (FIG. 3(a) shows a state that the voltage is maintained for easy explanation).

When the motor is accelerated just after the voltage is applied to the motor, an accelerating current flows in the motor. Accordingly, the current at a point B exceeds the threshold value, so that a control device controls the voltage applied to the motor to be zero at the point B.

That is, in FIG. 3(a), it is necessary to control the voltage applied to the motor to be zero at the point A where the current flowing through the motor exceeds the threshold value when the load is increased upon fully winding the seatbelt or withdrawing the seatbelt by an occupant. However, when the motor is started, the current also exceeds the threshold value at the point B. Accordingly, the voltage applied to the motor becomes zero, thereby stopping the motor at the point B as well.

In FIG. 3(b), the rotational speed of the motor increases stepwise, so that the accelerating current does not exceed the threshold value when the motor is started. However, a load current for winding up the seatbelt is overlapped at the second acceleration, so that the current including the accelerating current exceeds the threshold value at a point C. Accordingly, the voltage applied to the motor becomes zero, thereby stopping the motor at the point C.

In view of the problems described above, the present invention has been made, and an object of the present invention is to provide a winding control method of a seatbelt retractor and a seatbelt device having the seatbelt retractor, in which it is possible to prevent a motor from stopping before reaching a predetermined load due to an accelerating current of the motor.

Further objects and advantages of the invention will be apparent from the following description of the invention.

SUMMARY OF THE INVENTION

In order to attain the objects described above, according to a first aspect of the present invention, a winding control method of a seatbelt retractor for winding up a seatbelt with a motor includes detecting a current flowing through the motor, and stopping the motor when the current exceeds a predetermined value. The winding action is not stopped during the motor is accelerated even when the current exceeds the predetermined value.

In the first aspects the winding action is not stopped during the motor is accelerated even when a value of the detected current exceeds the predetermined value. Accordingly, it is possible to prevent the motor from stopping before reaching a predetermined load due to an accelerating current of the motor. A tachometer or a pulse encoder may be attached to the motor for detecting acceleration of the motor to determine whether the motor is accelerated. When an acceleration time is known in advance, it is arranged such that the winding action is not stopped from when a command is sent to accelerate the motor to when the motor is completely accelerated, thereby obtaining the same effect.

According to a second aspect of the present invention, a winding control method of a seatbelt retractor for winding up a seatbelt with a motor includes detecting a current flowing through the motor, and stopping the motor when the current exceeds a predetermined value. The winding action is not stopped until a predetermined period of time elapses from when the voltage applied to the motor increases even when a value of the detected current exceeds the predetermined value.

In a seatbelt retractor, instead of directly controlling a rotational speed of the motor, a voltage applied to the motor is controlled to adjust the rotational speed of the motor indirectly. In this case, the accelerating current is proportional to a difference between the applied voltage and a counterelectromotive force of the motor, and the counterelectromotive force of the motor is proportional to the rotational speed of the motor. Therefore, the accelerating current becomes a maximum value at the moment when the applied voltage is changed, and decreases as the rotational speed of the motor increases.

In the second aspect, in view of the characteristic described above, the winding action is not stopped only when the accelerating current is large even if the value of the detected current exceeds the predetermined value. It is determined whether the accelerating current is large through experiment or calculation.

According to a third aspect of the present invention, a winding control method of a seatbelt retractor for winding up a seatbelt with a motor includes detecting a current flowing through the motor, and stopping the motor when the current exceeds a predetermined value. The motor is accelerated such that the current flowing through the motor does not exceed the predetermined value.

In the third aspect, the acceleration of the motor is limited in such a range that a value of the current flowing through the motor never exceeds the predetermined value. Accordingly, it is possible to prevent the motor from stopping before reaching a predetermined load due to the accelerating current of the motor. The acceleration of the motor includes a rate of change in a rotational speed as well as a degree of increase when a command is sent to increase the rotational speed of the motor stepwise or when the voltage applied to the motor increases stepwise.

According to a fourth aspect of the present invention, a seatbelt device comprises the seatbelt retractor for winding the seatbelt with the winding control method according to one of the first aspect through the third aspect. Accordingly, it is possible to obtain the same effect.

In the present invention, it is possible to provide the winding control method of the seatbelt retractor capable of preventing the motor from stopping before reaching a predetermined load due to the accelerating current of the motor, and provide the seatbelt device having the same effect.

BRIEF DESCRIPTION OF THE DRAWINGS

FIGS. 3(a) and 3(b) are charts for explaining a conventional winding control method of a seatbelt retractor.

DETAILED DESCRIPTION OF PREFERRED EMBODIMENTS

Figure 1A:
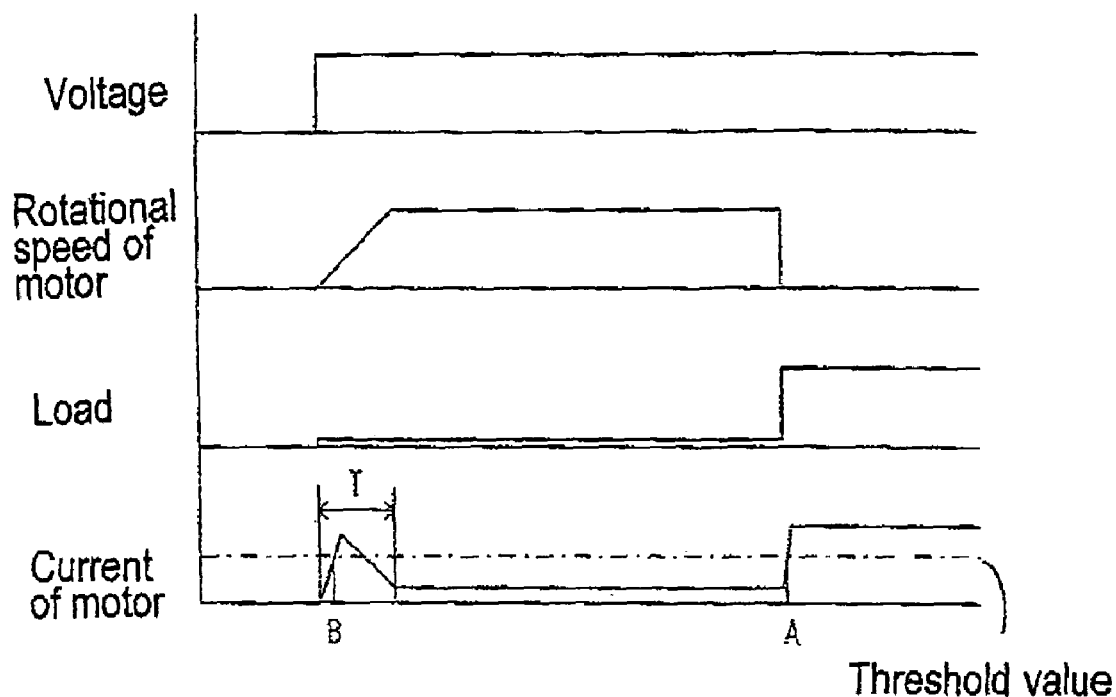
FIGS. 1(a) and 1(b) are charts for explaining a winding control method of a seatbelt retractor according to a first embodiment of the present invention.
Figure 1B:
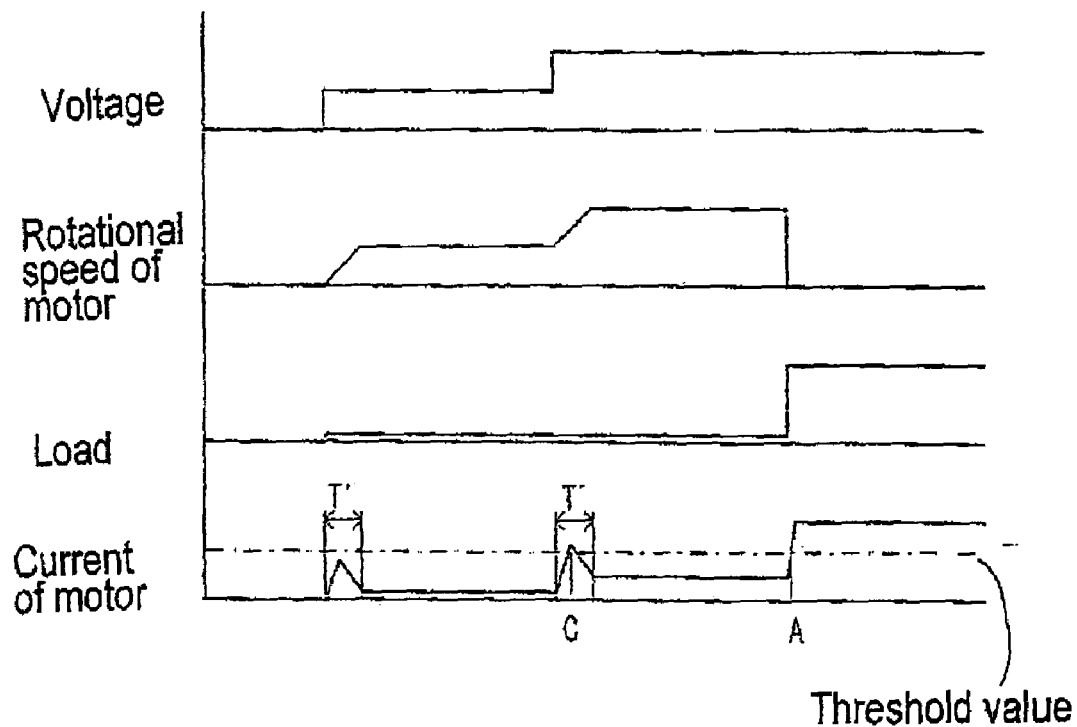

Hereinafter, embodiments of the present invention will be described with reference to the attached drawings. FIGS. 1(a) and 1(b) are charts corresponding to FIGS. 3(a) and 3(b) for explaining a winding control method of a seatbelt retractor according to a first embodiment of the present invention.

FIG. 1(a) shows a case of a normal winding control. The winding of a seatbelt is started in a state that a constant voltage is applied to a motor. In a state that the full amount of seatbelt is wound, the motor is stopped. Since the current of the motor exceeds a threshold value at a point A where the current of the motor is rapidly increased, it is designed to make the voltage applied to the motor to zero at the point A (FIG. 1(a) shows a state that the voltage is maintained without variation for convenience of explanation).

Since an accelerating current flows in the motor when the motor is accelerated just after a voltage is applied to the motor, however, the value of detected current at a point B exceeds the threshold value. Therefore, there is a problem that the voltage applied to the motor is made to zero also at the point B.

That is, in FIG. 1(a), though the point of making the voltage applied to the motor to zero essentially must be the point A where the current-flowing through the motor exceeds the threshold value because the load is increased by the completion of winding of the full amount of seatbelt, the seatbelt withdrawing action by an occupant, or the like. However, since the current at the start of the motor exceeds the threshold value at the point B, the voltage applied to the motor is made to zero at the point B so as to stop the motor.

In this embodiment, determination of whether or not the current of the motor exceeds the threshold value is halted while the motor is accelerated, i.e. from when a command to wind up is outputted to the motor to when a time period T determined in advance elapses. Therefore, the determination of whether or not the current of the motor exceeds the threshold value is not made at the point B where the current of the motor exceeds the threshold value due to effects of the accelerating current, thereby preventing the motor from being stopped. The motor is stopped at the point A where the load actually increases.

The same is true for the case of FIG. 1(b). The determination of whether or not the current of the motor exceeds the threshold value is halted every time an acceleration command is outputted to the motor, i.e. every time the voltage increases, from when the command is outputted to when a time period T' determined in advance elapses. Therefore, the determination of whether or not the current of the motor exceeds the threshold value is not made at a point C where the current of the motor exceeds the threshold value due to effects of the accelerating current, thereby preventing the motor from being stopped. The motor is stopped at the point A where the load actually increases.

When the degree of acceleration differs between the first time and the second time, the time period of halting may be changed according to the degree. Normally, the time period of halting set to the maximum accelerating time can be enough for the respective accelerations.

Though the time periods T and T' are set to the time periods from the start to the finish of acceleration of the motor in the above explanation, the time periods T and T' may be set to the time periods during a peak of the accelerating current because the accelerating current is the highest at the moment of variation in the applied voltage, and then is reduced according to the increase in rotational speed of the motor. Accordingly, the time period can be set to be shorter than the time period from the start to the finish of acceleration of the motor.

Figure 2:
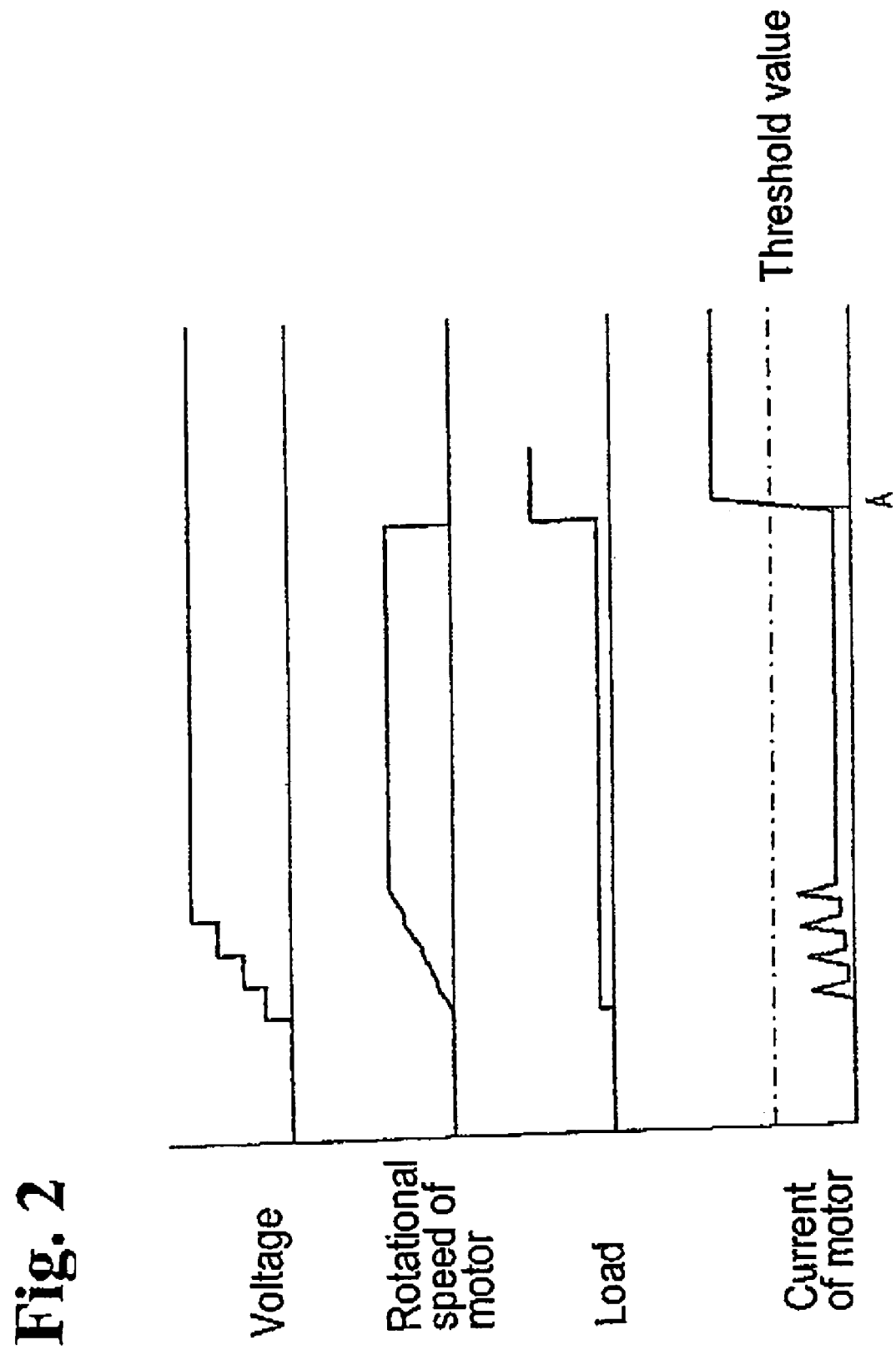
FIG. 2 is a chart for explaining a winding control method of a seatbelt retractor according to a second embodiment of the present invention.

FIG. 2 is a chart for explaining a winding control method of a seatbelt retractor according to a second embodiment of the present invention. In this embodiment, for accelerating a motor (at the start of the motor in FIG. 2), a command for rotational speed of the motor is not increased to a target value at once (that is, the voltage applied to the motor is not increased to a target value at once), and is increased stepwise. Therefore, a reduced accelerating current flows in the motor, so that the current never exceeds the threshold value. Accordingly, the motor is prevented from being stopped due to effects of the accelerating current. The motor is stopped at the point A where the load actually increases.

The disclosure of Japanese Patent Application, No. 2004-143179, filed on May 13, 2004, is incorporated in the application.

While the invention has been explained with reference to the specific embodiments of the invention, the explanation is illustrative and the invention is limited only by the appended claims.

What is claimed is:

1. A winding control method of a seatbelt retractor for winding a seatbelt with a motor, comprising:
   detecting a current flowing through the motor, and
   stopping the motor when the current exceeds a predetermined value,
   wherein the motor is not stopped while the motor is being accelerated even though the current exceeds the predetermined value.

2. A winding control method according to claim 1, wherein the current applied to the motor includes an accelerating current when a voltage is applied to the motor for rotation, and a load current when rotation of the motor is prevented.

3. A winding control method according to claim 2, wherein the motor is not stopped when the accelerating current exceeds the predetermined value.

4. A winding control method according to claim 3, wherein the motor is stopped only when the load current exceeds the predetermined value.

5. A winding control method of a seatbelt retractor for winding a seatbelt with a motor, comprising:
   detecting a current flowing through the motor, and
   stopping the motor when the current exceeds a predetermined value,
   wherein the motor is not stopped until a predetermined time period has passed after a voltage applied to the motor increases even though the detected current exceeds the predetermined value.

6. A winding control method according to claim 5, wherein the voltage applied to the motor includes an accelerating current for increasing rotation of the motor, and the predetermined time is a time after the voltage applied to the motor increases till the accelerating current decreases below the predetermined value.

7. A winding control method according to claim 6, wherein the motor is stopped only when a load current applied to the motor when rotation of the motor is prevented exceeds the predetermined value.

8. A winding control method of a seatbelt retractor for winding a seatbelt with a motor, comprising:
   detecting a current flowing through the motor, and
   stopping the motor when the current exceeds a predetermined value,
   wherein the motor is accelerated stepwise such that the current does not exceed the predetermined value.

9. A winding control method according to claim 8, wherein the motor is stopped only when a load current applied to the motor when rotation of the motor is prevented exceeds the predetermined value.

* * * * *